(12) United States Patent  
McGhie et al.

(10) Patent No.: US 8,123,127 B2
(45) Date of Patent: *Feb. 28, 2012

(54) CONVERSION OF NON-NEGOTIABLE CREDITS EARNED FROM A GAME OF CHANCE TO NEGOTIABLE FUNDS

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/720,743

(22) Filed: Mar. 10, 2010

(65) Prior Publication Data
US 2010/0169188 A1      Jul. 1, 2010

Related U.S. Application Data

(63) Continuation-in-part of application No. 11/420,255, filed on May 25, 2006, now Pat. No. 7,703,673.

(51) Int. Cl.
*G06K 5/00*      (2006.01)
(52) U.S. Cl. ......... 235/380; 235/375; 235/379; 235/487

(58) Field of Classification Search ............. 235/380, 235/375, 379, 487, 486, 382
See application file for complete search history.

(56) References Cited

U.S. PATENT DOCUMENTS 6,311,976 B1      11/2001   Yoseloff et al.
(Continued)

*Primary Examiner* — Edwyn Labaze
(74) *Attorney, Agent, or Firm* — Brian K. Buchheit; Sean McGhie

(57) ABSTRACT

Entertainment credits from a game of chance can be identified. The entertainment credits can be associated with an entity with which a user has previously interacted. The previous interactions can earning the entertainment credits, which are non-negotiable credits. Responsive to a user request, a conversion agency can convert a quantity of the entertainment credits to a quantity of negotiable funds, wherein the conversion agency is not directly associated with the entity. The user can be permitted to access the quantity of negotiable funds, wherein the quantity of negotiable funds are able to be applied to user specified purchases, wherein at least a portion of the user specified purchases involve at least one vender that does not honor the non-negotiable credits.

25 Claims, 4 Drawing Sheets

U.S. PATENT DOCUMENTS

| | | |
|---|---|---|
| 6,685,559 B2 | 2/2004 | Luciano et al. |
| 7,200,571 B1 | 4/2007 | Jenniges et al. |
| 2001/0054003 A1* | 12/2001 | Chien et al. ..................... 705/14 |
| 2002/0169021 A1* | 11/2002 | Urie et al. ....................... 463/25 |
| 2002/0198043 A1* | 12/2002 | Chowdhury ..................... 463/25 |
| 2006/0052150 A1* | 3/2006 | Hedrick et al. ................. 463/16 |

* cited by examiner

CONVERSION OF NON-NEGOTIABLE CREDITS EARNED FROM A GAME OF CHANCE TO NEGOTIABLE FUNDS

CROSS-REFERENCE TO RELATED APPLICATIONS

This continuation-in-part application claims the benefit of U.S. patent application Ser. No. 11/420,255 filed 25 May 2006 entitled "Web Based Conversion of Non-Negotiable Credits Associated with an Entity to Entity Independent Negotiable Funds". The entire contents of U.S. application Ser. No. 11/420,255 are incorporated by reference herein.

BACKGROUND

1. Field of the Invention

The present invention relates to the field of e-commerce and, more particularly, to the automatic conversion of non-negotiable credits earned from a game of chance to negotiable funds.

2. Description of the Related Art

Entities often reward consumers for utilizing their services with entertainment credits. These non-negotiable credits can often be applied towards products and/or services provided by a granting entity or its affiliates. For example, entertainment credits can be redeemed for prizes offered in a winnings storefront of an entertainment site. The entity offering the reward can be a gambling institution and the entertainment credits can be earnings from wagers while playing a game of chance.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
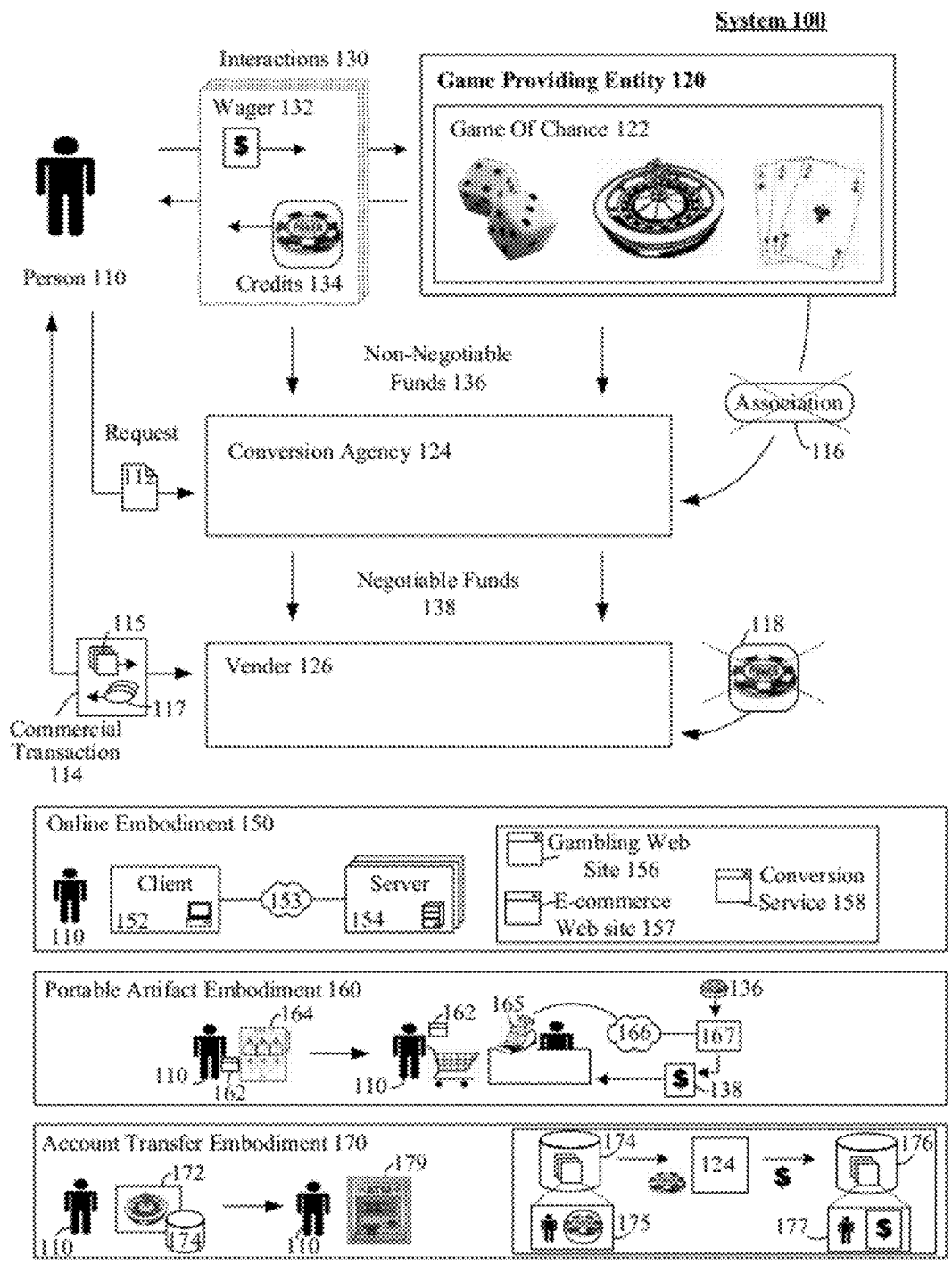
FIG. 1 is a diagram of a system in which non-negotiable funds earned from a game of chance are converted into negotiable funds in accordance with an embodiment of the inventive arrangements disclosed herein.

FIG. 1 is a diagram of a system 100 in which non-negotiable funds 136 earned from a game of chance 122 are converted into negotiable funds 138 in accordance with an embodiment of the inventive arrangements disclosed herein. In one embodiment, multiple interactions 130 can occur between a person 110 and a game providing entity 120, in which the person 110 plays a game of chance 122. During each interaction 130, a wager 132 can be made. With each successful outcome of the game of chance 122, person 110 can receive entertainment credits 134. With each non-successful outcome of the game of chance 122, the person 110 can lose their wager 132.

The entertainment credits 134 are non-negotiable funds 136. These funds 136 (e.g., the entertainment credits 134) may not be redeemable on an open market. For example, vender 126 will not accept 118 the entertainment credits 134 for commercial transactions 114. A conversion agency 124, which is not directly associated 116 with the game providing entity 120 can convert the non-negotiable funds 136 (which can be a quantity of entertainment credits 134) into negotiable funds 138. This conversion can occur in response to a request 112 by person 110.

Person 110 can conduct a commercial transaction 114 with vender 126. During the transaction 114, the person 110 can specify a user-selected set of requests 115 for goods and/or services 117 of the vender 126. The goods and/or services 117 can cost a quantity of negotiable funds 138, which are provided to the vender 126. In one embodiment, the negotiable funds 138 can be provided directly to the vender 126 by the conversion agency 124. In another, the negotiable funds 138 can be provided by the conversion agency 124 to person 110, who provides these funds 138 to the vender 126.

Numerous embodiments exist for conducting the conversions as described herein, a few of which are shown as embodiments 150, 160, and 170. Embodiment 150 shows an online embodiment, where a person 110 can interact (130) with a gambling Web site 156 to play the game of chance 122. The commercial transactions 114 can be conducted via an e-commerce Web site 157. Additionally, the conversion agency 124 can implement a software based conversion service 158, which performs the conversion of the non-negotiable funds 136 into the negotiable funds 138. The Web sites 156, 157 and service 158 can run within one or more servers 154. These servers 154 can be connected to a client 152 via a network 153, where the client 152 is a computing device that user 110 interacts (130 and/or 114) with.

In one configuration of embodiment 150, the conversion service 158 can be linked to a payment option present in the E-commerce Web site 157, which operates in a manner similar to PAYPAL, GOOGLE CHECKOUT, and the like. That is, a payment option can be presented that permits goods/services of vender 126 to be purchased using (at least in part) funds 138 converted from entertainment credits 134, which were earned from the game of chance 122.

Embodiment 160 shows a portable artifact embodiment, where a person 110 stores entertainment credits 134 from the game of chance 122 upon a portable artifact 162, which can be a physical card with a magnetic strip, a RFID storage device, a flash memory card, or other tangible artifact able to store digitally encoded (or even analog encoded) data. Machines 164 upon which the games of chance 122 are played can include a reader/writer able to alter content stored on the portable artifact 162. Thus, wagers 132 can be made from value stored on the artifact 162 and earnings (credits 134) can be recorded on the artifact 162. The person 110 can thereafter shop at a storefront of vender 126 and present a cashier 164 with the artifact 162. A cash register 165 used by the cashier 164 can be connected to a network 166. The conversion agency 124 can have a network element 168 connected to the network 166, which converts non-negotiable funds 136 on the artifact 162 into a quantity of negotiable funds 138 needed to complete the commercial transaction 114 conducted via the register 165 and cashier 164. From the perspective of the vender 126, the transaction 114 conducted via the register 165 is a "standard" transaction that results in the vender 126 receiving suitable negotiable funds 138 for providing the goods/services 117 to person 110.

Embodiment 170 shows an account transfer embodiment 170, where a person 110 plays a game of chance 122. Earnings (134, 136) from the game of chance 122 are recorded within a tangible data store 174 associated with the game providing entity 120. This data store 174 can include an account 175 for the person 110, which tracks an amount of entertainment credits 134, which are non-negotiable funds 136, of the person 110. Conversion agency 124 can directly access the account 175 of data store 174 and can convert a quantity of credits 134 into negotiable funds 138, which are recorded in a tangible data store 176 that is not directly associated with entity 120. The data store 176 can include an account 177 for the person 110, which contains an amount of negotiable funds 138, of the person 110. A person 110 can conduct commercial transactions 114 via a machine 179, such as a kiosk, an ATM machine, etc., which involve funds of account 177 changing. In one embodiment, the goods/services 117 received from person 110 in embodiment 170 can include cash (such as from an ATM machine). This cash can be an amount of cash-back received during transaction 114, can be the transaction 114 itself and may involve a transaction fee, which is extracted from account 177 by machine 179.

The embodiments 150-170 are for illustrative purposes only and are not intended to be (or to be construed as being) exhaustive or comprehensive. For example, any combinations of the embodiments 150, 160, 170 are to be considered within scope of the disclosure. Thus, a game of chance 122 can be conducted via a gambling Web site 156 (per embodiment 150), where a commercial transaction 114 using the converted entertainment credits 134 per agency 124 can be conducted at a storefront, where a cashier 164 interacts (130) with person 110. In another contemplated configuration, the game of chance 122 can be conducted with a machine 172 that places credits 134 in account 175 (per embodiment 170), which are converted and used to buy goods/services 117 via an e-commerce Web site 157 (per embodiment 150). In another contemplated configuration, entertainment credits earned via machine 164 and placed on artifact 162 (per embodiment 160), which can be placed in a machine 179, such as an ATM (per embodiment 170) to extract funds 138, which are converted (by agency 124) from the credits 134 stored on artifact 162.

In one embodiment, the conversion agency 124 can be compensated (e.g., charge a processing fee) for converting the non-negotiable funds 136 to negotiable funds 138. This fee can be paid to conversion agency 124 by the game providing entity 120, the person 110, and/or by the vender 126.

As used herein, a game of chance 122 can be a game in which an outcome is at least partially determined by random variables rather than strictly by strategy. There can be a level of "skill" or strategy involved in a game of chance 122, which can increase a person's 110 odds of a positive outcome. Common devices used in a game of chance 122 to add a significant random variable include dice, spinning tops, playing cards, roulette wheels, numbered balls drawn from a container, use of a computer or machine generated random number, and the like. Games of chance can also involve betting on an outcome of sports events and other such competitive games having an uncertain outcome.

Many (but not all) games of chance 122 are designed so that statistical odds favor the "house" or the game providing entity 120. That is, statistically, a large set of interactions 130 involving wagers 132 and credits 134 (assuming for the moment that the wagers 132 are credit 134 based wagers) will result in a net gain of credits 134 to the game providing entity 120 receiving more credits 134 (as wagers 132) than they provide (as winnings) over a relatively large set of interactions 130. Stated differently, a game of chance 122 can have mathematically-determined odds that ensure the house (e.g., game providing entity 120) has at all times an advantage over the players (e.g., person 110). This can be expressed more precisely by the notion of expected value, which is uniformly negative (from the player's (person 110) perspective). This advantage is called the house edge. In games of chance 120 such as poker where players (110) play against each other, the house (entity 120) takes a commission called the rake.

A game of chance 122 does not necessarily involve a wager 132, though it may. For example, sweepstakes are a type of a game of chance 122, which may (e.g., lottery) or may not (e.g., promotional sweepstakes) involve a wager 132. A promotional sweepstakes can be a marketing promotion targeted towards both generating enthusiasm and providing incentive reactions among customers by enticing consumers to submit free entries into drawings of chance that are tied to product or service awareness wherein the featured prizes are given away by sponsoring companies.

A game of chance 122 is defined herein to include any type of gambling game or event. In many jurisdictions, local as well as national, gambling (e.g., games of chance 122) are banned, heavily controlled by licensing, and/or are subject to government regulations and restrictions. Under US federal law, gambling is legal in the United States, and states are free to regulate or prohibit the practice. Thus, any event of uncertain outcome that is subject to state (or federal) regulations under a gambling statute is to be considered a game of chance 122 and within scope of the inventive arrangements (and claims) detailed herein. Because American Indian reservations are considered federally granted lands not subject to state regulation in the same way as other lands, many reservations geographically located in states that prohibit gambling (e.g., games of chance 122) are permitted to provide these games of chance 122, since the lands are not subject to state gambling laws. Similarly, cruise ships that travel outside state jurisdictions, often permit gambling (considered a game of chance 122 for purpose of the claims/disclosure) once the ships are located in international waters.

Games of chance 122 can involve a variety of machines (e.g., 164, 172, server 154 providing Web site 156). In many instances regulations (typically under state gambling statutes) can impose that odds in these gaming devices be statistically random, which helps to prevent manufacturers from making some high-payoff results impossible.

Games of chance 122 can include, but are not limited to, the following types of gambling: casino games, table games, fixed odd betting, pari-mutuel betting, sports betting, and the like. Specific games of chance 122 include, but are not limited to, Craps, Roulette, Baccarat, Blackjack, Poker, Pachinko, slot machines, Video poker, Bingo, Keno, dead pool, lotteries, pull-tab games and scratch cards, Mahjong, card games (e.g., Liar's poker, Bridge, Basset, Lansquenet, Piquet, Put, Teen patti), carnival games (e.g., The Razzle or Hanky Pank), coin tossing games (e.g., Head and Tail, Two-up), confidence tricks (e.g., Three-card Monte or the Shell game), dice-based games (e.g., Backgammon, Liar's dice, Passe-dix, Hazard, Threes, Pig, or Mexico), horse or greyhound racing, sports outcome betting, and the like.

Game providing entities 120 include any entity providing a game of chance 122 to others (person 110), where entertainment credits 134 can be earned. Game providing entities 120 can include casinos, cruise ships, States (for lottery, scratch off games, etc.), churches (running bingo games, for example), race tracks, online gambling site providers, slot-machine houses, carnivals, gambling parlors, companies (for promotional sweepstakes), High Schools (for raffles), and the like.

The wager 132 can be bet in an outcome of winning a game of chance 122. The wager 132 can risk money, previously earned entertainment credits 134 or something of material value on an event with an uncertain outcome with an intent on winning additional money, credits 134, and/or material goods/services. Typically the outcome of a wager 132 is evident within a short period (such as a duration of the game of chance 122). An amount of entertainment credits 134 earned from winning the game of chance 122 can vary in direct proportion to an amount of the wager (or the stake, which is placed at risk against the uncertain outcome.) A wager 132 can have odds associated with it.

Entertainment credits 134 are non-negotiable funds 136 that generally have no value outside of an environment (building, Web site, etc.) of the game providing entity 120. For example, casinos (one embodiment of entity 120) generally utilize casino tokens, chips, or plaques to represent a quantity of entertainment credits 134. Online gambling sites 156 (and electronic gambling devices) often provide an account to a person 110, where entertainment credits 134 are managed within this account in a computer readable storage medium.

Use of entertainment credits 134, such as casino tokens, can be more convenient then use of negotiable funds 138 for many reasons. For example, use of entertainment credits 134 makes theft and counterfeiting more difficult. Entertainment credits (which when having a physical representation are often a uniform size and weight) can be relatively easy to stack, count, etc. Additionally, studies have proven people (110) gamble more freely (play games of chance 122 with larger wagers 132 and frequency), when entertainment credits 134 than when wagering 132 with cash or other negotiable funds.

Additionally, use of entertainment credits 134, can have legal benefits that can permit entities 120 to conduct games of chance 122, which would be prohibited if negotiable funds 138 were utilized instead of entertainment credits 134. That is, numerous legal statutes and regulations exist that are more restrictive when gambling earnings are in a form of negotiable funds 138. For example, the Unlawful Internet Gambling Enforcement Act (UIGEA) of 2006 prohibits many online gambling activities with negotiable funds 138, which are permitted with certain forms of non-negotiable funds 136. For example, electronic fund transfers via credit cards or debit cards related to gambling winnings are generally prohibited by US banks. Similarly, wire transfers of negotiable funds 138 earned through games of chance 122 are legally prohibited in many instances. Many of these acts explicitly prohibit the transfer of negotiable funds from gambling earnings across state lines Non-negotiable funds 136 can include any of a variety of financial instruments that are not legal currency and not governed under article 3 of the Uniform Commercial Code (UCC). For example, non-negotiable funds 136 can include 10 Us issued by the game providing entity 120. In one embodiment, non-negotiable funds 136 can include secured transactions, which take a security interest on collateral owned by the game providing entity's 120 assets, which are subject to Article 9 of the UCC. In one embodiment, the non-negotiable funds 136 can include letters of credit, issued by the game providing entity 120.

Negotiable funds 138 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 138 include currency, and instruments covered by Article 3 and 4 of the Uniform Commercial Code. For a writing to be a negotiable instrument under Article 3,[1] the following requirements must be met: 1) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 138) is that they are payable to a bearer on demand.

The commercial transaction 114 can be one in which wherein the quantity of negotiable funds 138 are applied to user (110) specified (via request 115, for example) purchase of a good or service 117. Stated differently, a commercial transaction can be an economic transaction where person 110 receives a good or a service from vender 126 for value. Commercial transactions 114 can include a sale goods (117) from a storefront, a Web site, a catalog (mail order), over the phone, and the like. Transaction 114 can also include a payment for a service requested by person 110. Payment of the negotiable funds 138 during the commercial transaction 114 can occur before, after, or concurrent with the receipt (or shipping) of the goods or service 117. A contract (including specifics established by the parties (110 and 126) as well as legal defaults provided by the UCC or applicable common law/state law) between the vender 126 and person 110 established as part of the commercial transaction 114 can determine when payment (funds 138) for the goods/services 117 is due. In one embodiment, commercial transaction 114 can include transaction where currency is provided to person 110 by a vender 126 (a bank as part of an ATM transaction, for example) for a fee. This currency can be provided as a loan or as a withdrawal from an account of person 110, where the account includes the negotiable funds 138.

The conversion agency 124 can be a legal entity that converts non-negotiable funds 136 (including entertainment credits 134) into negotiable funds 138. The conversion agency 124 can lack a direct association 116 with the game providing entity 120. In one embodiment, no legal relationship of enablement of corporate identity (no parent, subsidiary, etc.) relationship can exist between the conversion agency 124 and entity 120. No fiduciary duties under corporate law can exist between agency 124 and game providing entity 120. In one embodiment, agency 124 can be geographically located outside property owned or leased by the game providing entity 120. In another, it can lease space and provide its services from entity 120 owned/leased land. In one embodiment, the conversion agency 124 can support multiple different game providing entities 120, which can be competitors of each other.

In one embodiment, the conversion agency is not a bank or similar financial institution (and may therefore be outside the guidelines established by UIGEA and other statues and regulations, which impose restrictions on banks). In one embodiment, the conversion agency 124 may be located in the same jurisdiction as the game providing entity (possibly to avoid legal entanglements/restrictions with operating in multiple or across jurisdictional boundaries) or may be located in a jurisdiction with favorable rules for performing the fund conversions.

Figure 2:
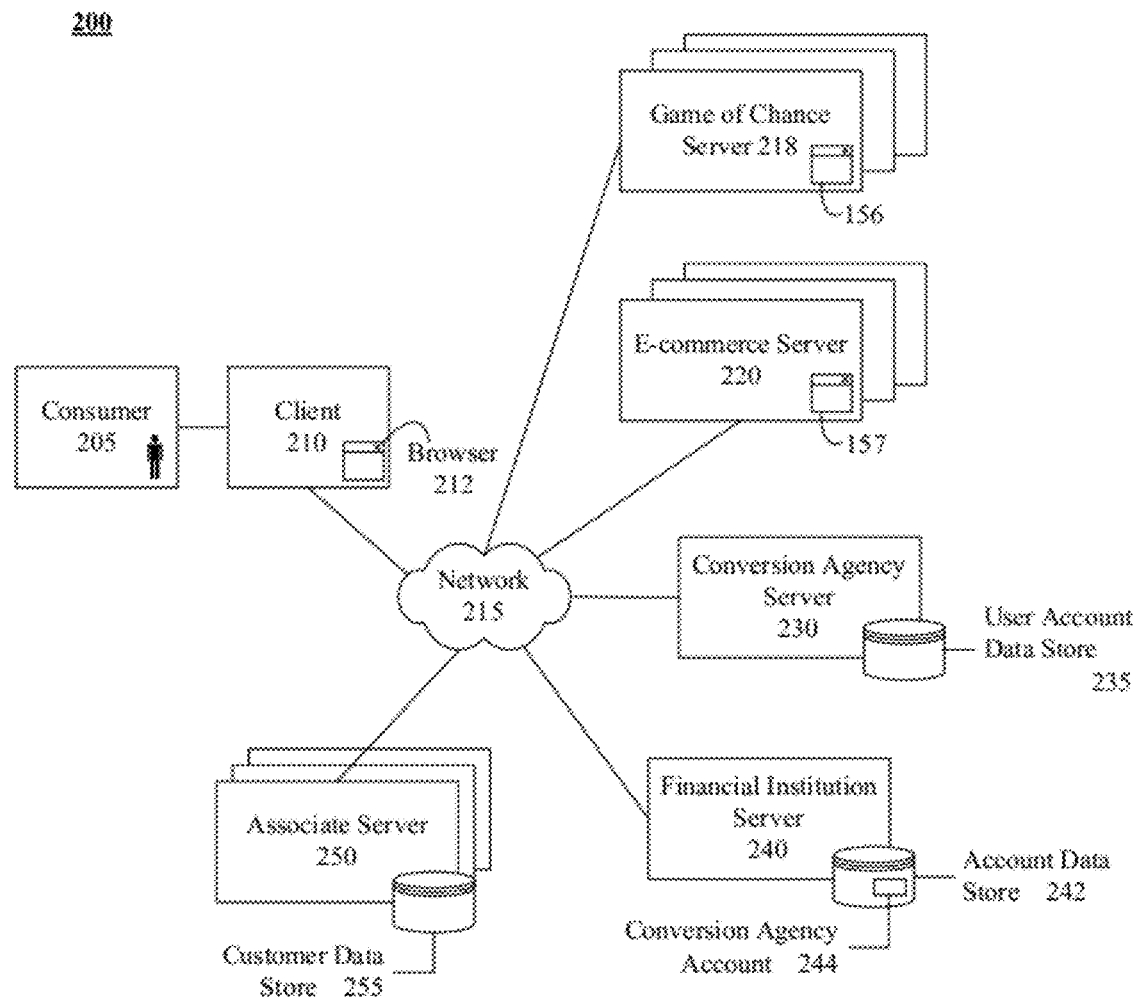
FIG. 2 is a schematic diagram of system for converting non-negotiable credits associated with a game providing entity to negotiable funds in accordance with an embodiment of the inventive arrangements disclosed herein.

FIG. 2 is a schematic diagram of system 200 for converting non-negotiable credits associated with a game providing entity to negotiable funds in accordance with an embodiment of the inventive arrangements disclosed herein. System 200 can represent a specific embodiment of system 100.

In system 200, consumer 205 can interact with a game of chance server 218, such as through a gambling Web site 156 that server 218 provides. Interactions can occur via a browser 212, rich internet interface, or other software executing upon client 210. Consumer 205 can purchase goods/services from an e-commerce Web site 157 provided by e-commerce server 220. These goods/services can be purchased using negotiable funds that a conversion agency server 230 provides. The conversion agency server 230 can convert entertainment credits resulting from earnings of a game of chance (non-negotiable funds) into the negotiable funds.

Client 210 can be any of a variety of devices including, but not limited to, a personal computer, a kiosk, a telephone, a personal data assistant (PDA), a mobile phone, and the like. Client 210 can include hardware, such as a processor, a memory, and a bus connecting them (as can server 218, 220, 230, 240, and/or 250). The hardware can execute computer program products (software/firmware) that is stored in a non-transitory storage medium. In one embodiment, client 210 can operate in a stand-alone fashion. Alternatively, client 210 can be a device that cooperatively participates in a network of distributed computing devices. Network 215 can facilitate data exchanges over wireless as well as line-based communication pathways and protocols.

In one embodiment, consumer 205 and conversion agency server 230 can interact with associate server 250, e-commerce server 220, and/or financial institution server 240 via network 215. Conversion agency server 230 includes user account data store 235 in which consumer 205 is a member. Associate server 250 includes customer data store 255 in which consumer 205 is a member. Financial institution server 240 includes account data store 242. Account data store 242 includes conversion agency account 244 corresponding to conversion agency 230.

Consumer 205 can earn non-negotiable credits from games of chance provided by server 218. These earnings (entertainment credits) can be managed by associate server 250. The quantity of these non-negotiable credits can be saved in customer data store 255. Consumer 205 can use conversion agency server 230 to convert the non-negotiable credits from associate server 250 into negotiable funds provided to the e-commerce server 220 or financial institution 240. In one embodiment, conversion agency 230 can maintain multiple accounts for the consumer 205. These different accounts can be associated with different game providing entities, and with different types of non-negotiable credits.

For example, consumer 205 can earns 500 credits from participating in an online game of chance hosted by server 218. Consumer 205 can choose to use conversion agency 230 to convert any or all of these credits to a monetary equivalent. Conversion agency 230 withdraws the necessary amount from conversion agency account 244 contained within the account data store 242 of financial institution 240 and transfers it to an account specified by consumer 205. In another example, consumer 205 uses conversion agency 230 to complete a purchase at e-commerce server 220. Again, conversion agency 230 withdraws the necessary amount from conversion agency account 244 contained within the account data store 242 of financial institution 240 and transfers it to the account of e-commerce server 220.

E-commerce server 220 can provide a Web site that supports online purchases of goods or services. In one embodiment, e-commerce server 220 can include a distinct payment option for conversion agency 230. This distinct payment option could process the conversion of credits through their Web site. Alternatively, the distinct payment option could launch an application to process the conversion of credit that is separate from their Web site. In another embodiment, associate server 250 can act as e-commerce server 220. In one embodiment, e-commerce server 220 can provide a software service (or can execute a software module) that permits the sale of goods or services, without necessarily providing a Web site. Further, e-commerce server 220 can be directly replaced with back-end system of a storefront server, serving the same relative functions as described in system 200 of facilitating the sales of goods/services.

Financial institution server 240 can be any of a variety of entities including, but not limited to, a bank, a credit card company, an investment firm, and the like. In one embodiment, financial institution server 240 can reside in the same country as consumer 205 associate server 250, and/or game of chance server 218. In another embodiment, financial institution server 240 can reside in a country other than that of consumer 205 and/or associate server 250.

As shown herein, data stores 255, 235, 242, 176, 174, and the like can be physically implemented within any type of hardware including, but not limited to, a magnetic disk, an optical disk, a semiconductor memory, a digitally encoded plastic memory, a holographic memory, or any other recording medium. Each of the data stores 255, 235, 242, 176, 174 can be stand-alone storage units as well as a storage unit formed from a plurality of physical devices, which may be remotely located from one another. Additionally, information can be stored within each data store 255, 235, 242, 176, 174 in a variety of manners. For example, information can be stored within a database structure or can be stored within one or more files of a file storage system, where each file may or may not be indexed for information searching purposes.

The network 215 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 215 can include local components and data pathways necessary for communications to be exchanged among computing device components and between integrated device components and peripheral devices. The network 215 can also include network equipment, such as routers, data lines, hubs, and intermediary servers which together form a packet-based network, such as the Internet or an intranet. The network 215 can further include circuit-based communication components and mobile communication components, such as telephony switches, modems, cellular communication towers, and the like. The network 215 can include line based and/or wireless communication pathways.

Figure 3:
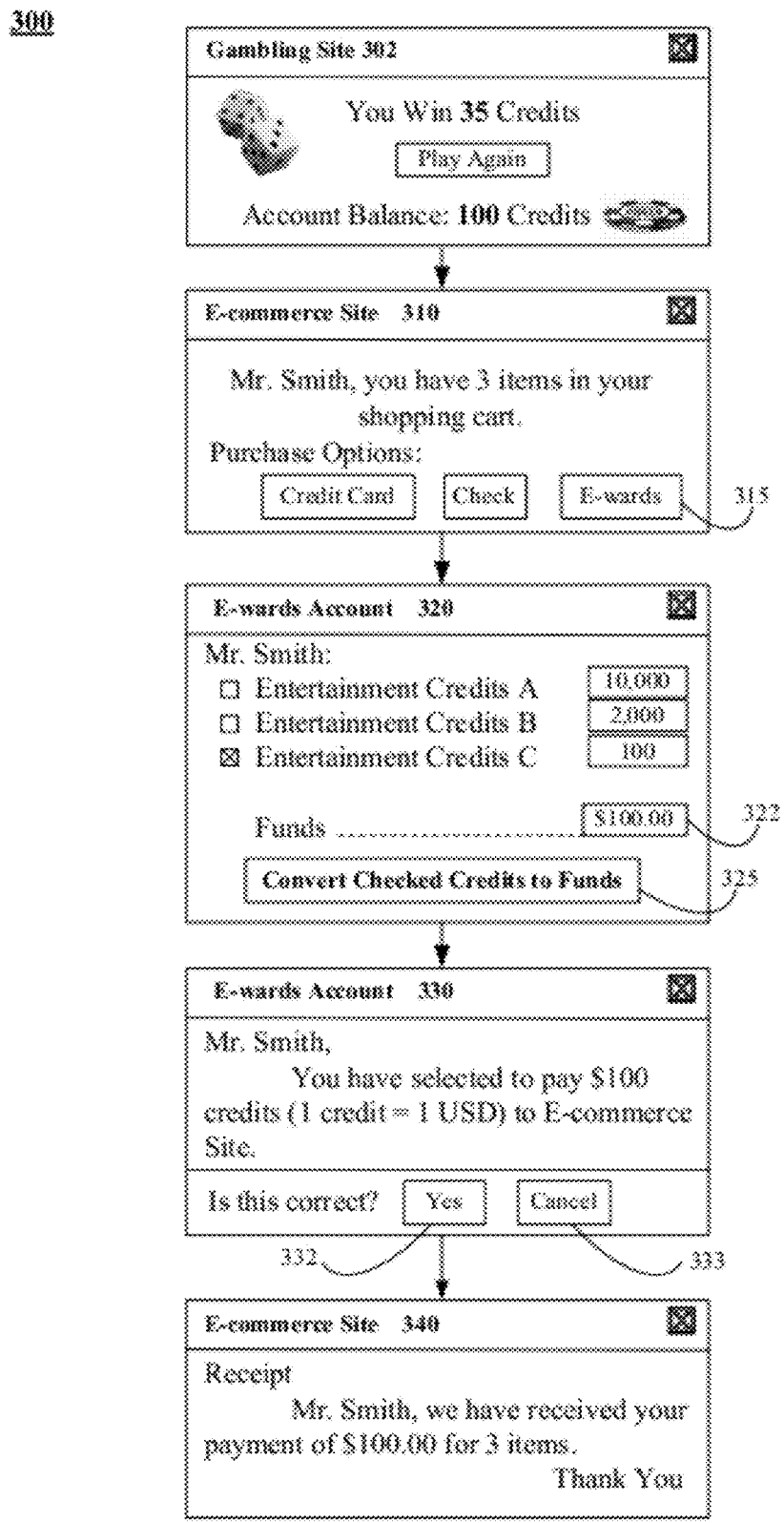
FIG. 3 is a schematic diagram of successive GUIs that illustrate the Web based conversion of non-negotiable credits associated with an entity earned from a game of chance to entity independent negotiable funds in accordance with an embodiment of the inventive arrangements disclosed herein.

FIG. 3 is a schematic diagram of successive GUIs that illustrate the Web based conversion of non-negotiable credits associated with an entity to entity independent funds in accordance with an embodiment of the inventive arrangements disclosed herein.

GUI 302 shows an interface from a gambling Web site. A quantity of entertainment credits are earned on this site, which can be later converted by a conversion agency for use in buying/selling items from a vender, who does not accept the entertainment credits.

GUI 310 can be a checkout window from an e-commerce site. GUI 310 includes payment button 315, which represents a payment option that includes the conversion of non-negotiable credits to purchase the items in the shopping cart. Selection of payment button 315 by a user can produce GUI 320.

GUI 320 can be a display window from a conversion agency. GUI 320 includes display box 322 and button 325. GUI 320 can be rendered by any of a variety of means including, but not limited to, a Web browser, a JAVA applet, a PERL script, and the like. In one embodiment, GUI 320 can be contained within the e-commerce site. GUI 320 can display the balance of non-negotiable, entertainment credits earned from one or more game providing entities. GUI 320 contains a means by which the user selects the type of non-negotiable credits to convert including, but not limited to, a set of radio buttons, a set of checkboxes, a highlighting mechanism, and the like. Display box 322 can display the monetary value of the selected non-negotiable credits. The value displayed in display box 322 can be based on preset conversion factors. Button 325 can represent the initiation of the process by which the selected non-negotiable credits are converted to negotiable funds. Selection of button 325 by a user can produce GUI 330.

GUI 330 can be a display window from a conversion agency. GUI 330 includes yes button 332 and cancel button 333. GUI 330 can be rendered by any of a variety of means including, but not limited to, a Web browser, a JAVA applet, a PERL script, and the like. In one embodiment, GUI 330 can be contained within the e-commerce site. GUI 330 can display a summary message of the transaction initiated by GUI 320. GUI 330 can include a means to continue the transaction, yes button 332, and a means to cancel the transaction, cancel button 333. Selection of cancel button 333 by a user cancels the transaction and can return the user to GUI 320. Selection of yes button 332 by a user completes the transaction initiated in GUI 320 and can produce GUI 340.

GUI 340 can be a display window from the same said e-commerce site. GUI 340 can contain a message acknowledging the successful conversion of the user's non-negotiable credits into negotiable funds for the purchase of the items in the shopping cart.

Figure 4:
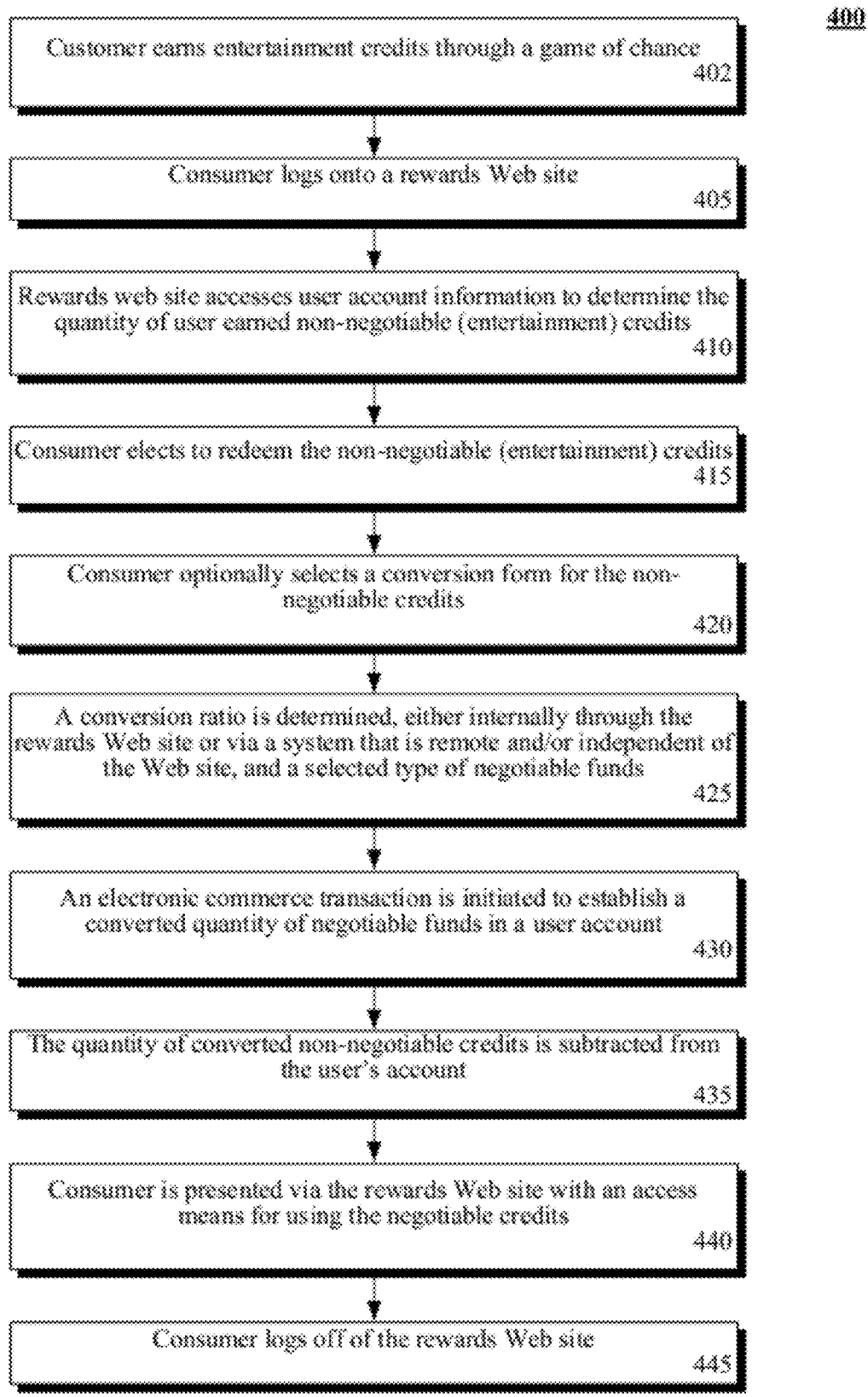
FIG. 4 is a flow chart of a method for the Web based conversion of non-negotiable, entertainment credits to negotiable funds system in accordance with an embodiment of the inventive arrangements disclosed herein.
Figure 1:
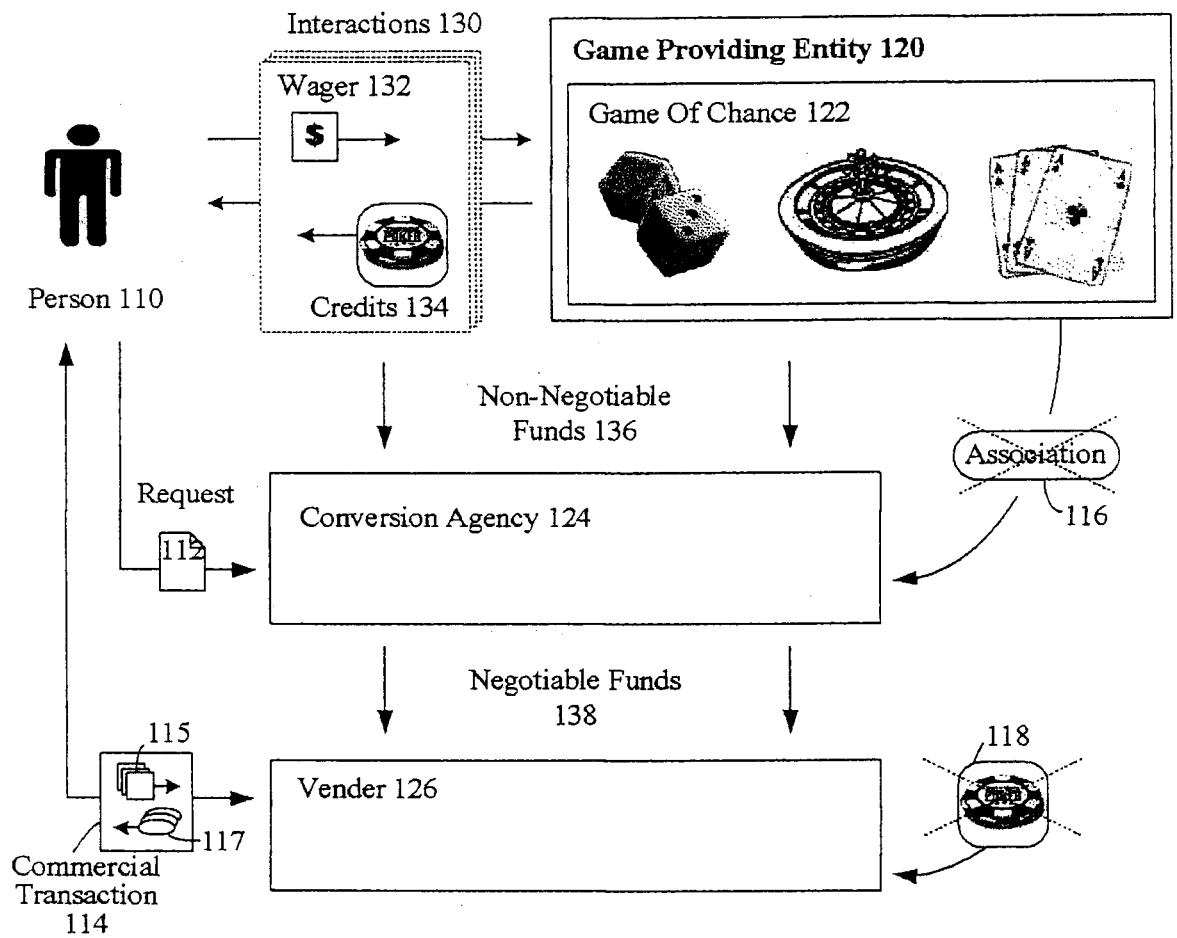
Figure 1:
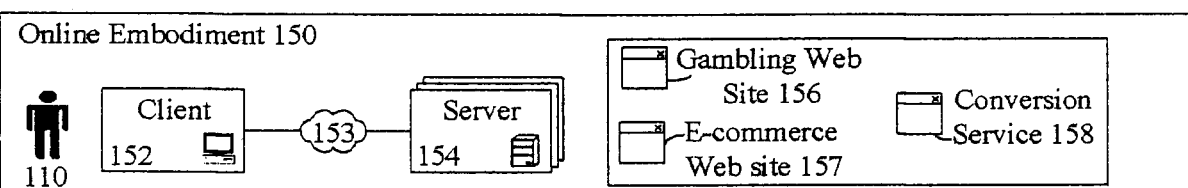
Figure 1:
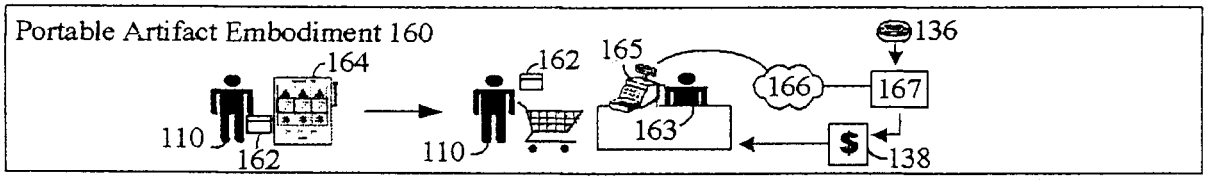
Figure 1:
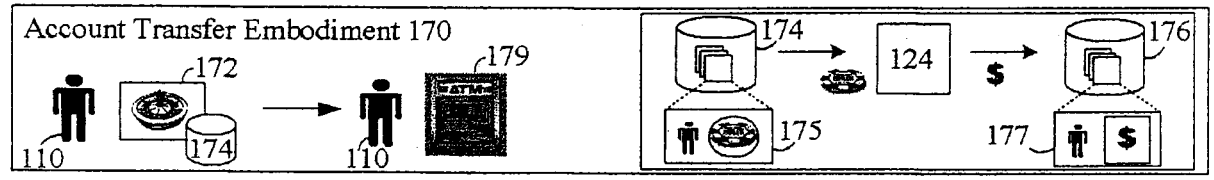

FIG. 4 is a flow chart of a method 400 for the Web based conversion of non-negotiable, entertainment credits to negotiable funds system in accordance with an embodiment of the inventive arrangements disclosed herein.

Method 400 can begin in step 402, where a customer earns entertainment credits through a game of chance. In step 405, the consumer can logs onto a rewards Web site. In step 410, the rewards Web site utilizes the user information provided in step 405 to access the consumer's account information and display the amount of non-negotiable credits in the consumer's account. The consumer elects to redeem some quantity of non-negotiable credits in step 415. If supported by the rewards Web site, step 420 can occur in which the consumer can select the form of negotiable funds to convert the non-negotiable credits. In step 425, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 430 to establish the converted amount of negotiable funds in a user account. The quantity of converted non-negotiable credits is subtracted from the user's account in step 435. In step 440, the rewards Web site presents the consumer with an access means for the negotiable funds. Lastly, the consumer terminates the session by logging off the rewards Web site in step 445.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

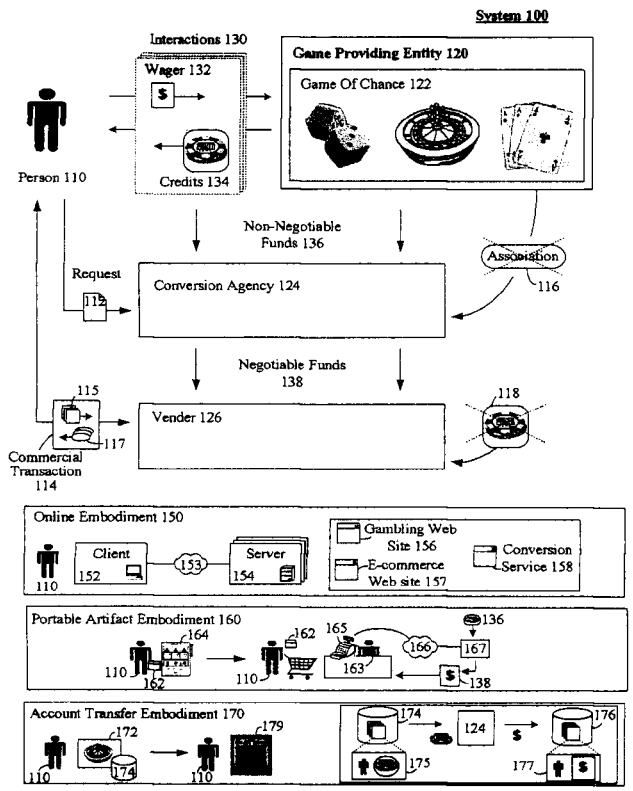

What is claimed is:

1. A method for converting credits to funds comprising:
identifying entertainment credits from a game of chance associated with an entity with which a user has previously interacted, the previous interactions earning the entertainment credits, which are non-negotiable credits;
responsive to a user request, a conversion agency converting a quantity of the entertainment credits to a quantity of negotiable funds, wherein the conversion agency is not directly associated with the entity; and
permitting the user to access the quantity of negotiable funds, wherein the quantity of negotiable funds are able to be applied to user specified purchases, wherein at least a portion of said user specified purchases involve at least one vender that does not honor the non-negotiable credits, wherein the identifying of entertainment credits is performed by computing equipment running software stored in a non-transitory storage medium, wherein the converting is performed by computing equipment running software stored in a non-transitory storage medium, wherein the permitting of access to the quantity of negotiable funds is performed by computing equipment running software stored in a non-transitory storage medium.

2. The method of claim 1, further comprising:
a Web site receiving user identification information for the user;
utilizing the identification information when authorizing the user for the Web site;
earning the entertainment credits through the gambling Web site.

3. The method of claim 1, further comprising:
earning the entertainment credits by playing a game of chance on a gambling Web site; and
purchasing goods or services via an e-commerce Web site, wherein the quantity of negotiable funds that are applied to user specified purchases are applied to purchases made via the e-commerce Web site.

4. The method of claim 1, wherein the user specified purchase is an e-commerce purchase, wherein the vender is an e-commerce vender, and wherein the e-commerce vender does not honor the non-negotiable credits, said method further comprising:
applying at least a portion of the quantity of negotiable funds to the e-commerce purchase.

5. The method of claim 1, further comprising:
purchasing goods or services via an e-commerce Web site, wherein the quantity of negotiable funds that are applied to user specified purchases are applied to purchases made via the e-commerce Web site, wherein the e-commerce Web site includes a distinctive user selectable payment option for obtaining funds from the conversion agency.

6. The method of claim 1, wherein the conversion agency not being directly associated with the entity means that the conversion agency is a separate legal entity from said entity; and
wherein permitting the user to access the quantity of negotiable funds means:
(a) the entity providing the user with cash, credit, or other negotiable funds, whereby the user is able to thereafter apply the cash, credit, or other negotiable funds to one or more user specified purchases, which include said user specified purchases;
(b) the entity providing the vender with cash, credit, or other negotiable funds, whereby the user is able to purchase goods or services from the vender using the entity provided cash, credit, or other negotiable funds; or
(c) combinations of (a) and (b).

7. The method of claim 1, further comprising:
the conversion agency providing at least a portion of the negotiable funds to the vender; and
the vender compensating the conversion agency for the negotiable funds of the providing step.

8. The method of claim 1, further comprising:
the conversion agency automatically and approximately immediately adding the quantity of negotiable funds to a user designated account associated with a financial institution.

9. The method of claim 1, further comprising:
the conversion agency automatically and approximately immediately adding the quantity of negotiable funds to a prepaid credit card account accessible by the user.

10. The method of claim 1, further comprising:
identifying different non-negotiable credits associated with a second entity with which said user has previously interacted, the previous interactions earning the different non-negotiable credits;
the conversion agency converting a quantity of the different non-negotiable credits to a second quantity of negotiable funds, wherein the conversion source and the entity are not directly associated with the second entity; and
adding the second quantity of negotiable funds to the quantity of negotiable funds from claim 1, whereby the quantity of user accessible negotiable funds is the sum of the funds converted from credits of the two entities.

11. The method of claim 1, wherein the entity is a casino, and wherein the non-negotiable credits comprise gambling earnings from games of chance played at the casino.

12. The method of claim 1, wherein the non-negotiable credits comprise gambling credits, wherein no fiduciary duties under corporate law exist between the conversion agency and the entity providing the game of chance.

13. The method of claim 1, wherein the entertainment credits are from a gambling game or are from a gambling event.

14. The method of claim 1, wherein the conversion agency, the vender, and the entity providing the game of chance are legally distinct entities that operate independent of one another.

15. The method of claim 1, further comprising:
applying funds from the financial institution account to an account of said at least one vender responsive to a user purchase involving said vender, wherein the converting, transferring, and applying steps occur in an approximately immediate fashion and are performed by computing equipment running software stored in a non-transitory storage medium.

16. The method of claim 1, further comprising:
purchasing goods or services from at least one vender that does not honor the non-negotiable credits using the quantity of negotiable funds wherein the purchasing of goods or services is performed by computing equipment running software stored in a non-transitory storage medium.

17. The method of claim 1, further comprising:
storing the entertainment credits from a game of chance upon a portable payment artifact, wherein the storing places digitally encoded information upon a tangible storage medium of the portable payment artifact, wherein the digitally encoded information identifies the quantity of the entertainment credits earned from the game of chance;
placing the portable payment artifact into a machine for reading the digitally encoded information;
responsive to placing the portable payment artifact in the machine, the machine triggering a network entity operated by the conversion agency that is remotely located from the machine, but is connected to the machine via a network to convert the quantity of entertainment credits read from the portable payment artifact into the quantity of negotiable funds;
the machine providing the user with the quantity of negotiable funds during a commercial transaction in which the machine is used as user interface device; and the machine changing the quantity of entertainment credits available to the user by subtracting the quantity of converted entertainment credits from a total number of entertainment credits available to the user.

18. A method for converting credits to funds comprising:

identifying, via at least one processor executing programmatic instructions, entertainment credits from a game of chance associated with a first entity with which a user has previously interacted, the previous interactions earning the entertainment credits, which are non-negotiable credits;

responsive to a user request, a conversion agency converting, via at least one processor executing programmatic instructions, a quantity of the entertainment credits to a first quantity of negotiable funds, wherein the conversion agency is not directly associated with the first entity; and identifying, via at least one processor executing programmatic instructions, different non-negotiable credits associated with a second entity with which said user has previously interacted, the previous interactions earning the different non-negotiable credits;

the conversion agency converting, via at least one processor executing programmatic instructions, a quantity of the different non-negotiable credits to a second quantity of negotiable funds, wherein the conversion source and the first entity are not directly associated with the second entity; and adding, via at least one processor executing programmatic instructions, the second quantity of negotiable funds to the first quantity of negotiable funds; and permitting the user to access the quantity of negotiable funds, wherein the quantity of negotiable funds are able to be applied to user specified purchases, wherein at least a portion of said user specified purchases involve at least one vender that does not honor the non-negotiable credits, whereby the quantity of user accessible negotiable funds is the sum of the funds converted from credits of the two entities.

19. The method of claim 18, wherein the conversion agency not being directly associated with the entity means that the conversion agency is a separate legal entity from said entity; and wherein permitting the user to access the quantity of negotiable funds means:

(a) the entity providing the user with cash, credit, or other negotiable funds, whereby the user is able to thereafter apply the cash, credit, or other negotiable funds to one or more user specified purchases, which include said user specified purchases;

(b) the entity providing the vender with cash, credit, or other negotiable funds, whereby the user is able to purchase goods or services from the vender using the entity provided cash, credit, or other negotiable funds; or (c) combinations of (a) and (b).

20. A method for converting credits to funds comprising:

identifying entertainment credits from a game of chance associated with an entity with which a user has previously interacted, the previous interactions earning the entertainment credits, which are non-negotiable credits;

responsive to a user request, a conversion agency converting a quantity of the entertainment credits to a quantity of negotiable funds, wherein the conversion agency is not directly associated with the entity, wherein the conversion agency not being directly associated with the entity means that the conversion agency is a separate legal entity from said entity;

permitting the user to access the quantity of negotiable funds, wherein the quantity of negotiable funds are able to be applied to user specified purchases, wherein at least a portion of said user specified purchases involve at least one vender that does not honor the non-negotiable credits; and purchasing goods or services from at least one vender that does not honor the non-negotiable credits using the quantity of negotiable funds, wherein the identifying of entertainment credits is performed by computing equipment running software stored in a non-transitory storage medium, wherein the converting is performed by computing equipment running software stored in a non-transitory storage medium, wherein the permitting of access to the quantity of negotiable funds is performed by computing equipment running software stored in a non-transitory storage medium, and wherein the purchasing of goods or services is performed by computing equipment running software stored in a non-transitory storage medium.

21. The method of claim 20, wherein the purchasing of goods or services is via an e-commerce Web site, wherein the quantity of negotiable funds that are applied to user specified purchases are applied to purchases made via the e-commerce Web site.

22. A method for converting credits to funds comprising:

identifying entertainment credits from a game of chance associated with an entity with which a user has previously interacted, the previous interactions earning the entertainment credits, which are non-negotiable credits;

storing, via at least one processor executing programmatic instructions, the entertainment credits from the game of chance upon a portable payment artifact, wherein the storing places digitally encoded information upon a tangible storage medium of the portable payment artifact, wherein the digitally encoded information identifies the quantity of the entertainment credits earned from the game of chance;

receiving the portable payment artifact at a machine for reading the digitally encoded information;

responsive to receiving the portable payment artifact in the machine and responsive receiving a user request, the machine triggering a network entity operated by a conversion agency that is remotely located from the machine, but is connected to the machine via a network to convert the quantity of entertainment credits read from the portable payment artifact into the quantity of negotiable funds, wherein the conversion agency is not directly associated with the entity, wherein the conversion agency not being directly associated with the entity means that the conversion agency is a separate legal entity from said entity;

permitting the user to access the quantity of negotiable funds, wherein the quantity of negotiable funds are able to be applied to user specified purchases, wherein at least a portion of said user specified purchases involve at least one vender that does not honor the non-negotiable credits, wherein the permitting comprises;

the machine providing the user with the quantity of negotiable funds during a commercial transaction in which the machine is used as a user interface device; and the machine changing the quantity of entertainment credits available to the user by subtracting the quantity of converted entertainment credits from a total number of entertainment credits available to the user, wherein the identifying of entertainment credits is performed by computing equipment running software stored in a non-transitory storage medium, wherein the converting is performed by computing equipment running software stored in a non-transitory storage medium.

23. An system for converting credits to funds comprising:
means for identifying entertainment credits from a game of chance associated with an entity with which a user has previously interacted, the previous interactions earning the entertainment credits, which are non-negotiable credits;
means for, responsive to a user request, a conversion agency converting a quantity of the entertainment credits to a quantity of negotiable funds, wherein the conversion agency is not directly associated with the entity; and
means for permitting the user to access the quantity of negotiable funds, wherein the quantity of negotiable funds are able to be applied to user specified purchases, wherein at least a portion of said user specified purchases involve at least one vender that does not honor the non-negotiable credits, wherein the identifying of entertainment credits is performed by computing equipment running software stored in a non-transitory storage medium, wherein the converting is performed by computing equipment running software stored in a non-transitory storage medium, wherein the permitting of access to the quantity of negotiable funds is performed by computing equipment running software stored in a non-transitory storage medium.

24. The system of claim 23, wherein the entertainment credits are from a gambling game or are from a gambling event.

25. The system of claim 23, wherein the conversion agency not being directly associated with the entity means that the conversion agency is a separate legal entity from said entity; and
wherein the means for permitting the user to access the quantity of negotiable funds comprises:
(a) means for the entity providing the user with cash, credit, or other negotiable funds, whereby the user is able to thereafter apply the cash, credit, or other negotiable funds to one or more user specified purchases, which include said user specified purchases;
(b) means for the entity providing the vender with cash, credit, or other negotiable funds, whereby the user is able to purchase goods or services from the vender using the entity provided cash, credit, or other negotiable funds; or
(c) means for combinations of (a) and (b).

* * * * *

UNITED STATES PATENT AND TRADEMARK OFFICE
CERTIFICATE OF CORRECTION

| | | |
|---|---|---|
| PATENT NO. | : 8,123,127 B2 | |
| APPLICATION NO. | : 12/720743 | |
| DATED | : February 28, 2012 | |
| INVENTOR(S) | : Sean I. McGhie and Brian K. Buchheit | |

It is certified that error appears in the above-identified patent and that said Letters Patent is hereby corrected as shown below:

The title page showing the illustrative figure should be deleted and replaced with the attached title page.

ON THE TITLE PAGE:
Item (74) In the Attorney, Agent, or Firm section, the words "Brian K. Buchheit; Sean McGhie" should be replaced with --Brian K. Buchheit--.

Item (57) in line 4 of the Abstract, the words "interactions can earning" should read --interactions can earn--.

In the drawings, sheet 1 of 4 consisting of FIG. 1, should be deleted and replaced with the attached corrected sheet 1 of 4 consisting of FIG. 1.

IN THE SPECIFICATIONS:
Column 1, line 64, the words "of system" should read --of a system--.

Column 3, line 14, the words "network element 168" should read --network element 167--; line 54, the words "cashier 164" should read --cashier 163--; line 56, the words "machine 172" should read --machine 164 for a game of chance 172--; line 62, the words "which can be placed" should read --can be placed--.

Column 5, line 48, the words "convenient then" should read --convenient than--; line 55, the words "when entertainment credits" should read --with entertainment credits--.

Column 6, line 10, the words "10 Us" should read --credits--; line 45, the words "wherein the quantity" should read --the quantity--; line 50, the words "sale goods" should read --sale of goods--.

Column 7, line 19, the word "statues" should read --statutes--.

Signed and Sealed this
Twenty-ninth Day of May, 2012

David J. Kappos
*Director of the United States Patent and Trademark Office*

Column 8, line 11, the words "can earns 500" should read --can earn five hundred--; line 38, the words "with back-end system" should read --with a back-end system--; line 63, the words "network 215" should read --network 215, 153, 166--.

Column 9, lines 2, 5, 8, 12, each instance of the number "215" should read --215, 153, 166--; line 14, the words "schematic diagram" should read --schematic diagram 300--.

IN THE CLAIMS:
Column 10, line 5, the words "can logs onto" should read --can log onto--; claim 1, line 59, the words "the previous interactions earning" should read --wherein previous interactions with the entity earn--.

Column 11:
claim 2, line 18, the words "the gambling" should read --a gambling--;
claim 3, line 25, the words "to user" should read --to the user--;
claim 4, line 30, the words "a game" should read --the game--.

Column 12:
claim 10, line 8, the words "the previous interactions earning" should read --wherein previous interactions with the entity earn--;
claim 10, line 12, the words "conversion source" should read --conversion agency--;
claim 15, line 34, the words "the financial institution account" should read --a financial institution account--;
claim 16, line 43, the words "using the" should read --by using the--;
claim 17, line 67, the words "as user interface device" should read --as a user interface device--.

Column 13:
claim 18, line 9, the words "the previous interactions earning" should read --wherein previous interactions can earn--;
claim 18, line 21, the words "the previous interactions earning" should read --wherein previous interactions with the entity earn--;
claim 18, line 26, the words "the conversion source" should read --the conversion agency--;
claim 18, line 38, the words "the sum" should read --a sum--;
claim 20, line 59, the words "the previous interactions earning" should read --wherein previous interactions with the entity earn--.

Column 14:
claim 20, line 7, the words "from at least" should read --from the at least--;
claim 22, line 29, the words "the previous interactions earning" should read --wherein previous interactions with the entity earn--;
claim 22, line 36, the words "identifies the" should read "identifies a"; claim 22, line 42, the words "responsive receiving" should read --responsive to receiving--;
claim 22, line 47, the words "the quantity" should read --a quantity--; claim 22, line 58, the word "comprises;" should read --comprises:--;
claim 22, line 63, the words "the quantity" should read --a quantity--.

Column 15:
claim 23, line 4, the words "An system" should read --A system--;
claim 23, line 7, the words "the previous interactions earning" should read --wherein previous interactions with the entity earn--.

(12) United States Patent
McGhie et al.

(10) Patent No.: US 8,123,127 B2
(45) Date of Patent: *Feb. 28, 2012

(54) CONVERSION OF NON-NEGOTIABLE CREDITS EARNED FROM A GAME OF CHANCE TO NEGOTIABLE FUNDS

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/720,743

(22) Filed: Mar. 10, 2010

(65) Prior Publication Data

US 2010/0169188 A1    Jul. 1, 2010

Related U.S. Application Data

(63) Continuation-in-part of application No. 11/420,255, filed on May 25, 2006, now Pat. No. 7,703,673.

(51) Int. Cl.
*G06K 5/00* (2006.01)
(52) U.S. Cl. ......... 235/380; 235/375; 235/379; 235/487

(58) Field of Classification Search .................. 235/380, 235/375, 379, 487, 486, 382
See application file for complete search history.

(56) References Cited

U.S. PATENT DOCUMENTS 6,311,976 B1    11/2001    Yoseloff et al.
(Continued)

*Primary Examiner* — Edwyn Labaze
(74) *Attorney, Agent, or Firm* — Brian K. Buchheit; Sean McGhie

(57) ABSTRACT

Entertainment credits from a game of chance can be identified. The entertainment credits can be associated with an entity with which a user has previously interacted. The previous interactions can earning the entertainment credits, which are non-negotiable credits. Responsive to a user request, a conversion agency can convert a quantity of the entertainment credits to a quantity of negotiable funds, wherein the conversion agency is not directly associated with the entity. The user can be permitted to access the quantity of negotiable funds, wherein the quantity of negotiable funds are able to be applied to user specified purchases, wherein at least a portion of the user specified purchases involve at least one vender that does not honor the non-negotiable credits.

25 Claims, 4 Drawing Sheets